US010746677B2

(12) United States Patent
Brosseau et al.

(10) Patent No.: US 10,746,677 B2
(45) Date of Patent: *Aug. 18, 2020

(54) OPTICAL FLASH POINT DETECTION ON AN AUTOMATED OPEN CUP FLASH POINT DETECTOR

(71) Applicant: Petroleum Analyzer Company, LP, Houston, TX (US)

(72) Inventors: Michael Brosseau, Houston, TX (US); Thomas Herold, Boxberg-Uiffingen (DE); Simon Blass, Mergetsoechheim (DE); Oezkan Oguz, Lauda-Koenigshofen (DE)

(73) Assignee: Petroleum Analyzer Company, LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,873

(22) Filed: Jun. 12, 2019

(65) Prior Publication Data

US 2019/0293581 A1 Sep. 26, 2019

Related U.S. Application Data

(63) Continuation of application No. 15/499,285, filed on Apr. 27, 2017, now Pat. No. 10,324,051.

(51) Int. Cl.
*G01N 25/50* (2006.01)
*G01N 21/33* (2006.01)
*G01N 25/52* (2006.01)

(52) U.S. Cl.
CPC ............ *G01N 25/50* (2013.01); *G01N 21/33* (2013.01); *G01N 25/52* (2013.01)

(58) Field of Classification Search
CPC ......... G01N 21/33; G01N 25/50; G01N 25/52
USPC ............................................................. 73/36
See application file for complete search history.

(56) References Cited

U.S. PATENT DOCUMENTS

| 3,011,337 A | 12/1961 | McGlynn |
| 4,963,745 A | 10/1990 | Maggard |
| 5,291,422 A | 3/1994 | Esztergar |
| 5,412,465 A | 5/1995 | Baylor et al. |
| 5,869,343 A | 2/1999 | Handschuck et al. |
| 5,932,796 A | 8/1999 | Arthaud et al. |

(Continued)

OTHER PUBLICATIONS

Flame Sensor Uvtron R2868, "Quick Detection of FLme from Distance, Compact UV Sensor with High Sensitivity and Wide Directivity, Suitable for Flame Detectors and Fire Alarms," 4 pages. Hamamatsu. http://hamamatsu.com/jp/en/R2868.html.

(Continued)

*Primary Examiner* — Benjamin R Schmitt
(74) *Attorney, Agent, or Firm* — Snyder, Clark, Lesch & Chung, LLP

(57) ABSTRACT

An open cup flash point detector is shown that rapidly increases the temperature of the substance being tested until temperature is close to a theoretical flash point. Thereafter, as temperature is slowly increased, an igniter flame moves in an arc over the upper lip of the test cup while simultaneously a UV sensor senses a wedge-shaped area, also immediately over the upper lip of the test cup. The arc of the igniter flame and the wedge-shaped area do not overlap. By incremental increases in temperature and repeating the arc movement of the igniter flame, the flash point can be detected by the UV sensor.

18 Claims, 3 Drawing Sheets

(56) References Cited

U.S. PATENT DOCUMENTS

| | | | |
|---|---|---|---|
| 6,542,831 | B1 | 4/2003 | Moosmuller et al. |
| 6,560,545 | B2 | 5/2003 | Stedman et al. |
| 6,671,630 | B2 | 12/2003 | Stedman et al. |
| 6,789,021 | B2 | 9/2004 | Rendahl et al. |
| 6,859,766 | B2 | 2/2005 | Von Drasek et al. |
| 6,897,071 | B2 | 5/2005 | Sonbul |
| 7,404,411 | B2 | 7/2008 | Welch et al. |
| 7,837,966 | B2 | 11/2010 | Gross et al. |
| 8,586,365 | B2 | 11/2013 | Wells et al. |
| 8,592,213 | B2 | 11/2013 | Wilkinson et al. |
| 8,781,757 | B2 | 7/2014 | Farquharson et al. |
| 9,285,307 | B2 | 3/2016 | Koseoglu et al. |
| 2006/0059917 | A1* | 3/2006 | Plimpton .............. F01D 17/08 60/772 |
| 2006/0213554 | A1 | 9/2006 | Welch et al. |
| 2008/0172187 | A1 | 7/2008 | Koehler et al. |
| 2012/0150451 | A1 | 6/2012 | Skinner et al. |
| 2014/0229010 | A1 | 8/2014 | Farquharson et al. |
| 2016/0187253 | A1 | 6/2016 | Koseoglu et al. |

OTHER PUBLICATIONS

"Open and Closed Cup Flash Point—What is the difference?", PEFTEC, Jun. 26, 2014, 5 pages. https://www.petro-online.com/news/analytical-instrumentation/11/breaking_nws/open_a . . . .

"Standard Test Method for Flash and Fire Points by Cleveland Open Cup Tester", Designation: D92-16, ASTM International, Dec. 13, 2016. 11 pages.

"Vapor," Wikipedia, https://en.wikipedia.org/wik/Vapor. Accessed online Dec. 13, 2016, 3 pages.

"Fire Point," https://en.wikipedia.orga/wiki/Fire_point. Accessed online Dec. 13, 2016, 1 page.

"Cleveland open-cup method," https://en.wikipedia.org/wiki/Cleveland_open-cup_method. Accessed online Dec. 13, 2016, 2 pages.

* cited by examiner

OPTICAL FLASH POINT DETECTION ON AN AUTOMATED OPEN CUP FLASH POINT DETECTOR

CROSS-REFERENCE TO RELATED APPLICATION

This application is a continuation of U.S. patent application Ser. No. 15/499,285 filed on Apr. 27, 2017, the contents of which are hereby incorporated herein by reference in their entirety.

BACKGROUND OF THE INVENTION

1. Field of the Invention

The present invention relates to flash point detection and, more particularly, to a method and apparatus for optical flash point detection in an open cup tester.

2. Description of the Prior Art

The term "flash point" is the lowest temperature at which a volatile substance can be vaporized into a flammable gas. To measure the flash point, an ignition source has to be introduced to the substance with the "flash" being the point at which the vapor is ignited. While there are various methods of measuring the flash point, those methods can generally be divided into two main categories: open and closed cup flash points.

Measuring a flash point using an open cup method is conducted in a vessel which is exposed to the air outside. Temperature of a substance being tested is rapidly raised until the temperature approaches the theoretical flash point, after which the temperature is gradually raised with an ignition source being periodically passed over the top of the substance. When the substance reaches a temperature at which it "flashes" and ignites, the true "flash point" has been reached. The most commonly-used open cup method is called the Cleveland open cup. There is a published standard by the American Society of Testing and Materials (ASTM) entitled "Standard Test Method for Flash and Fire Points by Cleveland Open Cup Tester," ASTM D92-16A. The flash point of a substance may vary according to the distance between the substance being measured and the ignition source, i.e., the height of the flame above the cup.

The closed cup flash point detector, as the name suggests, uses a closed cup with the substance being tested being inside a closed container which is not open to outside atmosphere. A lid is sealed in place over the substance being tested and the ignition source is introduced into the vessel itself. There are four general kinds of closed cup flash point detectors, Pensky Martens, Abel, Tag and Small Scale (also known as Setaflash).

As automated test equipment started being developed, the industry adopted an ionization ring as a method of detecting the flash point. The ionization ring would sit inside the test cup between the sample and the ignition source. The ionization ring would sense a charge caused by the ignition. There were drawbacks to using the ionization ring method of detection of flashpoint. Some samples being measured expand as they are heated, which expansion may cause contact with the ionization ring and give a false signal. Samples with high water content also give a false flash point signal. Other samples such as silicon oils produce vapors that coat the ionization ring, which insulates the ionization ring so that it does not sense the ignition. Failing to sense the ignition creates a safety issue because the detector will continue to heat the sample.

In using the Cleveland open cup method, a test cup (usually brass) is filled to a certain level with the substance being measured. Then, the temperature of the substance being measured is increased rapidly until it approaches the theoretical flash point. Thereafter, the temperature is increased at a slow constant rate as it approaches the theoretical flash point. The increase in temperature of the substance being tested will cause the substance to produce flammable vapor in increasing quantities and density. The lowest temperature at which a small test flame passed over the surface of a liquid causes the vapor from the liquid to ignite is considered the substance flash point.

The "fire point" of a substance is the lowest temperature at which the vapor of that substance will continue to burn for at least five (5) seconds after ignition by an open flame. At the "flash point," a lower temperature, a substance will ignite briefly, but vapor is not being produced at a rate to sustain the fire. Most tables of material properties only list the flash points. Generally, the fire points of a substance are about ten degrees Centigrade (10.degree. C.) higher than the flash points.

A related patent over which this invention is an improvement is U.S. Pat. No. 5,932,796 issued on Aug. 3, 1999, entitled "Apparatus for the Determination of a Flash Point of a Substance" by Arthaud et al., which related patent is incorporated by reference. However, the '796 patent has some problems that affect its accuracy. The flame 5 is located some distance above the substance 2 being tested, which affects the measurement. Further, the flame 5 may cause false readings indicating that a flash point has been reached.

SUMMARY OF THE INVENTION

It is an object of the present invention to provide for optical flash point detection using an open cup method.

It is another object of the present invention to provide for optical flash point detection using an ultraviolet (UV) detector.

It is yet another object of the present invention to provide an optical flash point detector that minimizes interference from other light sources.

It is even another object of the present invention to use an UV detector located in special housing that allows the UV detector to scan the surface of a wedge-shaped portion of a cup containing the substance being tested for flash point.

It is still another object of the present invention to provide a method and apparatus for detecting flash point of a substance being tested without interference from the igniter flame.

It is another object of the present invention to provide an apparatus and method where the igniter flame can skim a portion of the surface of the substance being tested while simultaneously an ultraviolet detector scans a different portion of the surface of the substance being tested without ever receiving interfering light from the igniter flame.

A stand is provided that has a test cup mounted in the upper surface of the stand with a heating element being located there below. At predetermined intervals, an igniter flame swings back and forth over the top of the test cup in a predefined arc. A UV sensor is provided inside of a UV sensor mount that allows the UV sensor to have a viewing angle immediately above the test cup that is adjacent to, but does not overlap, the arc of the igniter flame.

The temperature of the substance being tested inside of a test cup is raised very rapidly until it approaches the theoretical flash point after which the substance is heated in a manner to cause a slower rise in temperature. During the slower rise in temperature, periodically an igniter flame will swing across the surface of the test cup. This is done automatically with a computer supplying the gas to the igniter, lighting the igniter and causing the igniter to swing from side-to-side. Also, the computer measures the temperature and the output of the UV sensor, all of which is stored on a recording display or other suitable electronic storage device.

The UV sensor mount is especially designed so that the UV sensor can only see a predefined wedge-shaped area just above the test cup, which is adjacent to, but does not include, the igniter flame.

The UV sensor mount has an optical system of lens and slits receiving a converging beam of light, also called a collimator.

DESCRIPTION OF THE PREFERRED EMBODIMENT

Figure 1:
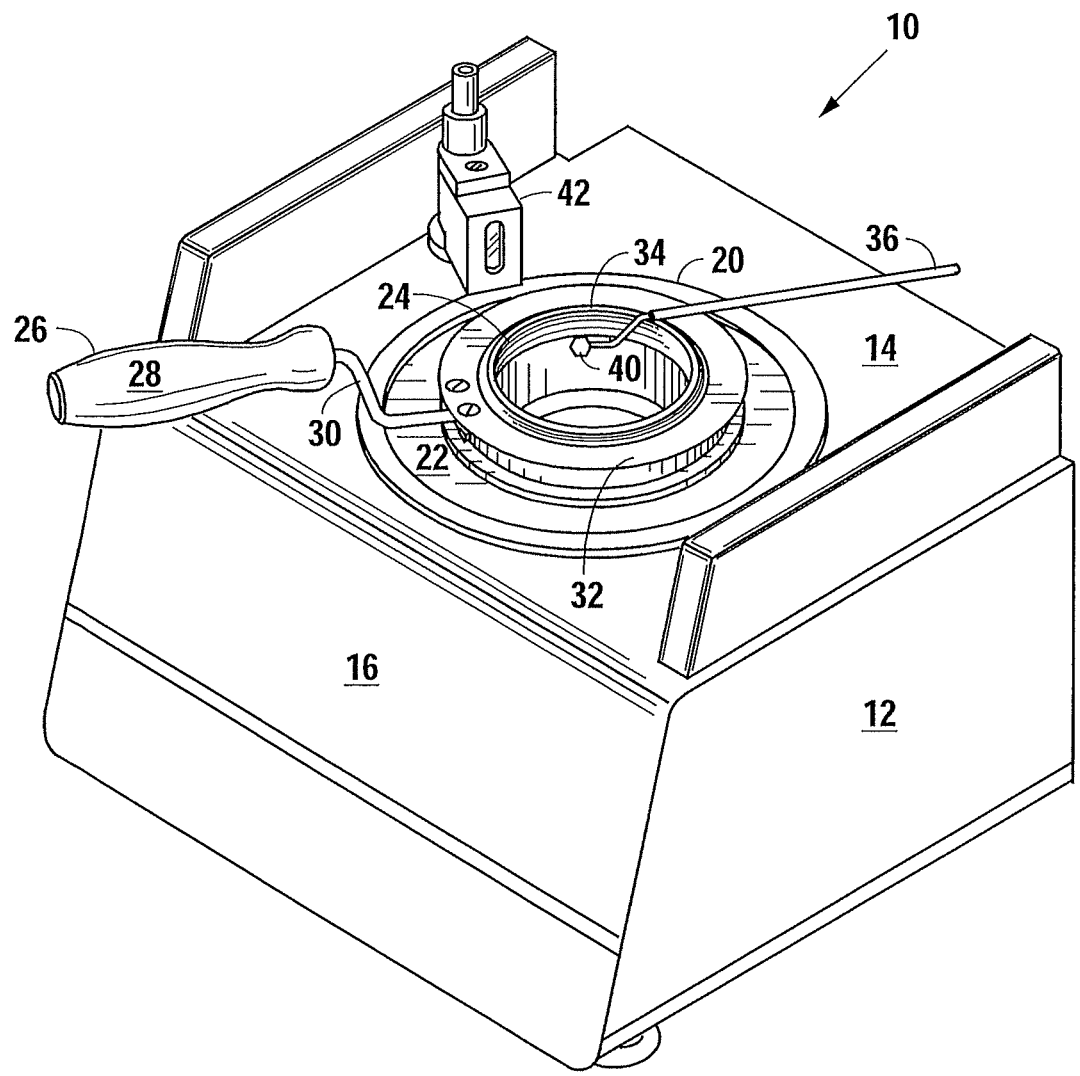
FIG. 1 is a perspective view of the mechanical portion of an open cup flash point detector.
Figure 2:
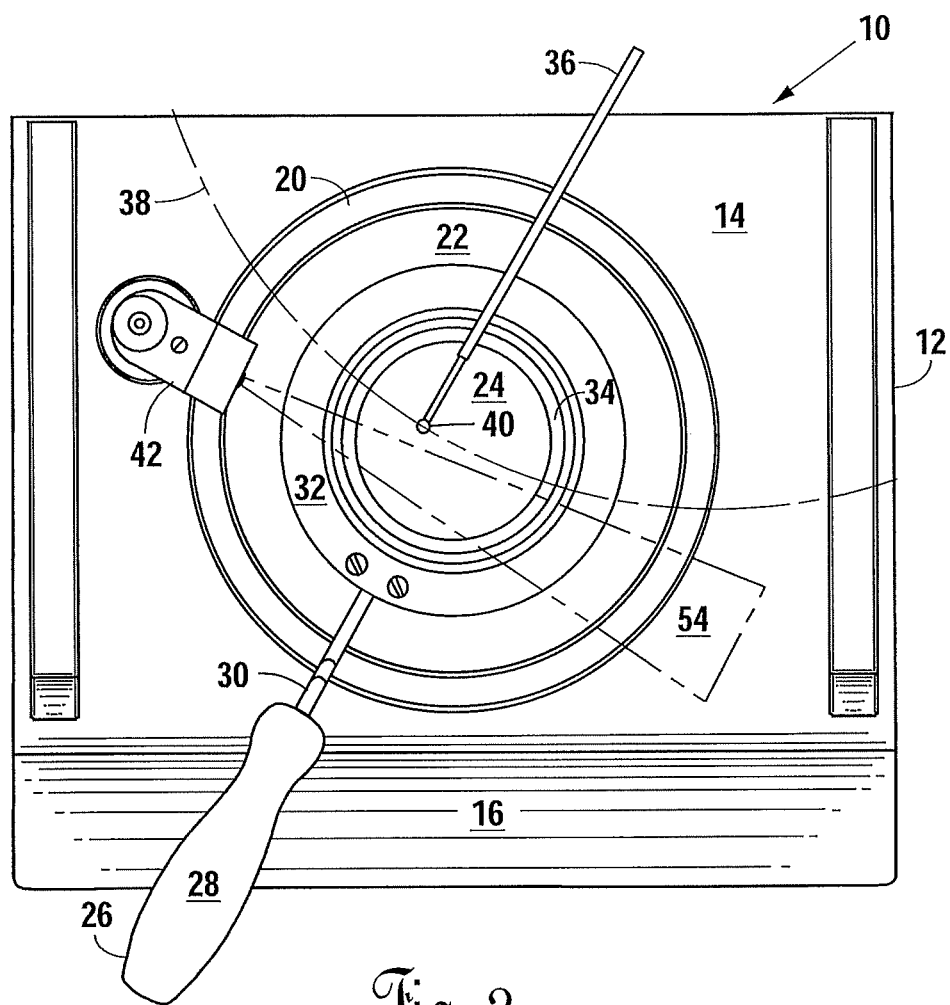
FIG. 2 is a top view of FIG. 1, illustrating movement of the igniter flame and viewing area of a UV sensor from a collimator.

Referring to FIGS. 1 and 2 in combination, an open cup flash point detector 10 is shown. More detail on open cup flash point detectors can be found in ASTM D92-16A, entitled "Standard Test Method for Flash and Fire Points by Cleveland Open Cup Tester."

The open cup flash point detector 10 has a stand 12 with an upper surface 14. Vertical walls 16 enclose the stand 12 and support the upper surface 14.

Thermal insulation arranged in a cylinder shape with an upper rim 20 is inserted in a circular opening (not shown) in the upper surface 14 of the open cup flash point detector 10. The upper rim 20 holds the thermal insulation extending there below, which upper rim 20 is supported by the upper surface 14.

A retaining ring 22 is located inside of the upper rim 20, which retaining ring 22 has a center opening just large enough to receive therein a test cup 24, which test cup 24 meets the requirement of ASTM D92-16A.

Below the test cup 24 inside of the enclosure 16 is a heater (not shown) that is used to heat the test cup 24. Because the test cup 24 gets hot, a test cup holder 26 is provided. The test cup holder 26 has an insulated handle 28, connecting rod 30 and pick-up ring 32. The pick-up ring 32 is part of the test cup 24.

Located just above the upper lip 34 of the test cup 24 is an igniter arm 36. The igniter arm 36 periodically swings back and forth in the arc 38 illustrated in FIG. 2. On the tip 40 of the igniter arm 36 will be an igniter flame. The reach of the igniter flame is defined by the arc 38, which igniter flame is just above the upper lip 34 of the test cup 24.

Also located on the upper surface 14 of the open cup flash point detector 10 is a collimator 42. The internal design of the collimator 42 is shown in the vertical cross-sectional view of FIG. 3. The collimator 42 includes an ultraviolet (UV) sensor 44 located inside of chamber 46. Connecting to the chamber 46 and the UV sensor 44 is a slot 48 in the collimator 42. At one end of the slot 48 is located the UV sensor 44. At the other end of the slot 48 are located lens 50, which lens 50 have a beam opening 52 therein. The beam opening 52 will allow light outside the collimator 42 that travels through beam opening 52 to reach the UV detector 44. A wedge-shaped area 54 defines the area sensed by the UV sensor 44 in collimator 42. The arc 38 of the igniter flame never touches the wedge-shaped area 54. This prevents any false triggering of the UV sensor 44 by the igniter flame from tip 40.

While many different types of UV sensors 44 may be used, the Hamamatsu R286A flame sensor sold under the mark UVTRON has been found to work satisfactorily in the present invention. R2868 is a UVTRON ultraviolet ON/OFF detector that makes use of photo electric effect. It has a narrow spectrum sensitivity of between 185 nm to 260 nm and is insensitive to visible light.

While not shown in FIGS. 1 and 2, a thermometer would be inserted inside of the test cup 24. The substance to be measured would fill the test cup 24 so that the tip 40 of the igniter arm 36 swings back and forth just above a surface of the liquid being tested.

Figure 3:
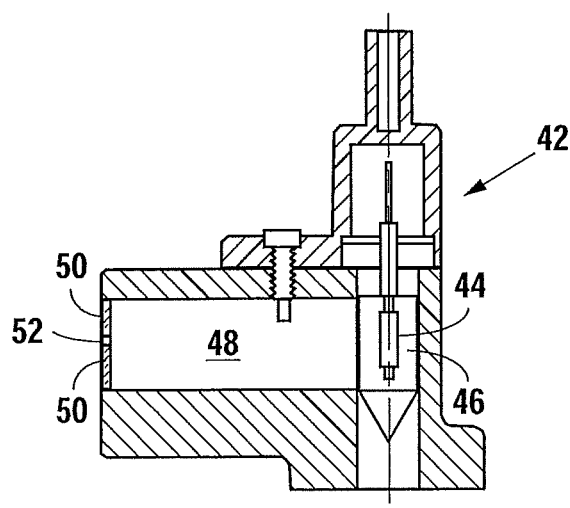
FIG. 3 is a vertical cross-sectional view of the collimator shown in FIGS. 1 and 2.
Figure 4:
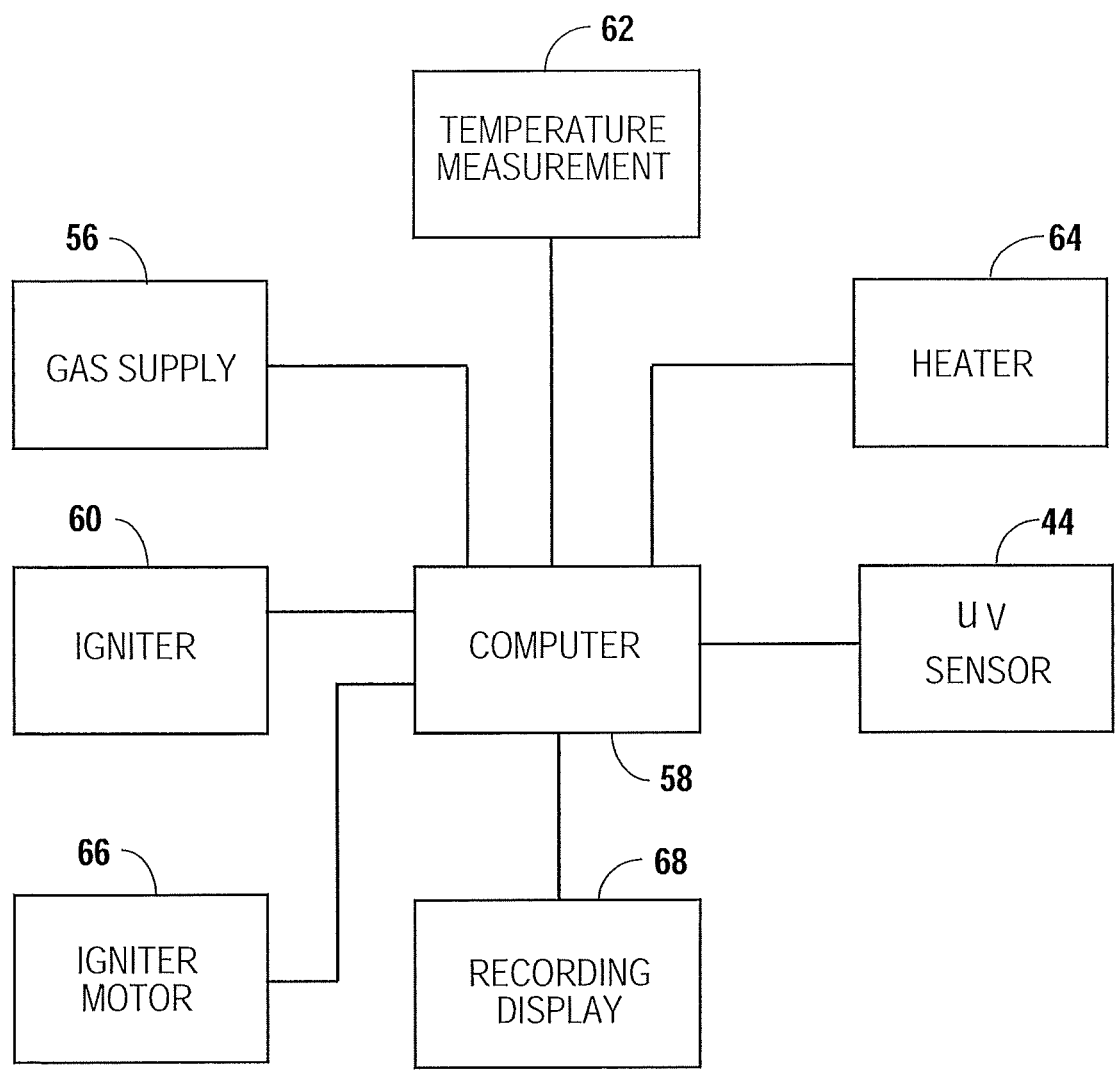
FIG. 4 is an illustrative block diagram of controls for the open cup flash point detector shown in FIGS. 1 and 2.

The open cup flash point detector 10, as shown in FIGS. 1-3, can be automated as shown in FIG. 4 by having a gas supply 56 turned on by computer 58 and ignited by igniter 60. The fluid being measured in the test cup 24 is continually monitored by a temperature measurement 62.

Initially, the computer 58 will turn on a heater 64 that will heat the liquid contained in the test cup 24. The heater 64 may be a resistance type heater or may use gas from the gas supply 56. Initially, the substance being tested in the test cup is raised in temperature very rapidly by the heater 64. As the substance being tested in the test cup 24 nears the theoretical flash point, the amount of heat being applied by the heater 64 is reduced. Thereafter, as the substance being tested is increased in temperature a slight amount (such as one or two degrees), by further application of heat from the heater 64. An igniter motor 66 is turned ON to swing the igniter 60 over the test cup 24, which igniter 60 has a flame on the tip 40 thereof.

If the substance being tested does not ignite as is determined by UV sensor 44, computer 58 causes the heater 64 to continue to slowly increase the temperature of the substance in the test cup 24 as is determined by temperature measurement 62. After the temperature of the substance being tested is raised another increment, the process is repeated where the igniter motor 66 again swings the tip 40 of the igniter arm 36 over the upper surface of the test cup 24.

Again, if the UV sensor 44 does not detect a flash of the substance being tested, the process will again be repeated. These steps are repeated in incremental increases of temperature until the substance being tested flashes as detected by the UV sensor 44. All of the steps undertaken in the open cup flash point detector 10 are recorded in a recording display 68 or a similar electronic storage device.

The UV sensor 44 receives light from a wedge-shaped area 54 that extends just over the upper lip 34 of the test cup 24. The wedge-shaped area 54 is immediately adjacent to the arc 38 of the igniter flame, but the two do not overlap. In this manner, the igniter flame moving in an arc 38 can never cause a false triggering of the UV detector 44. The shape of the wedge-shaped area 54 is determined by the lens 50 and the beam opening 52 as contained in the collimator 42.

What is claimed is:

1. A flash point detector, comprising:
   a stand having an upper surface with an opening in the upper surface;
   a test cup located in the opening;
   a heater configured to heat the test cup and a substance contained within the test cup, wherein the test cup does not include a lid or cover;
   an igniter configured to generate a flame above the test cup, wherein the flame is configured to periodically move within a first area above the test cup;
   an ultraviolet (UV) detector located on the upper surface of the stand, wherein the UV detector is configured to:
   monitor a second area above the test cup, wherein the second area does not overlap the first area, and
   detect when the substance reaches the flash point; and
   a chamber housing the entire UV detector, wherein the chamber includes an open area or slot configured to allow the UV detector to detect ultraviolet light from the second area and not from the first area.

2. The flash point detector of claim 1, wherein the chamber further comprises:
   a lens located on a first side of the open area or slot, wherein the lens includes a beam opening configured to allow ultraviolet light from the second area to reach the UV detector.

3. The flash point detector of claim 1, wherein the igniter comprises:
   an igniter motor; and
   an igniter arm,
   wherein the flame is located at an end of the igniter arm, and
   wherein the igniter motor is configured to move the igniter arm within the first area.

4. The flash point detector of claim 3, wherein the igniter motor is configured to periodically move the igniter arm in an arc above the test cup.

5. The flash point detector of claim 4, wherein the heater is configured to incrementally increase a temperature of the substance while the igniter arm is periodically moved above the test cup.

6. The flash point detector of claim 3, further comprising:
   a temperature detector configured to measure and record the temperature of the substance in the test cup.

7. The flash point detector of claim 6, wherein the temperature detector is further configured to record the temperature at which the UV detector detects that the substance reaches the flash point.

8. The flash point detector of claim 1, wherein the second area comprises a wedge-shaped area.

9. The flash point detector of claim 1, further comprising:
   insulation located in the stand, wherein the insulation is configured to thermally insulate the test cup from the stand.

10. The flash point detector of claim 1, further comprising:
    a test cup holder configured to allow a user to pick up the test cup.

11. A method of determining a flash point of a substance using an open cup, comprising:
    placing a substance in a test cup;
    inserting the test cup in an upper opening of a stand;
    continuously measuring a temperature of the substance in the test cup, wherein the test cup does not include a lid or cover;
    increasing the temperature of the substance in the test cup until the substance approaches a flash point;
    periodically moving a flame in a first area above the test cup;
    monitoring a second area located above the test cup with an ultraviolet (UV) detector, housed entirely in a chamber, to detect when the substance flashes, wherein the second area does not overlap the first area, wherein the monitoring the second area comprises:
    detecting ultraviolet light generated in the second area via an opening in the chamber; and
    detecting the temperature of the substance when the substance flashes.

12. The method of claim 11, wherein the periodically moving the flame comprises:
    periodically moving the flame in an arc above the test cup, wherein the flame is located at an end of an igniter arm.

13. The method of claim 12, further comprising:
    igniting a gas source to generate the flame.

14. The method of claim 11, further comprising:
    recording the temperature when the substance flashes.

15. The method of claim 11, wherein the opening comprises an opening in a lens located at one end of the chamber.

16. The method of claim 11, wherein the monitoring an area comprises monitoring a wedge-shaped area above the test cup.

17. The method of claim 11, wherein the increasing the temperature comprises;
    increasing the temperature at a first rate until an estimated flash point is reached, and increasing the temperature at a second rate after the estimated flash point is reached, wherein the first rate is greater than the second rate.

18. The method of claim 11, wherein the increasing the temperature comprises increasing the temperature while an igniter arm is moving the flame above the test cup.

* * * * *